Feb. 27, 1934. J. C. CROWLEY 1,949,293
PRESSURE GAUGE
Filed Nov. 28, 1932
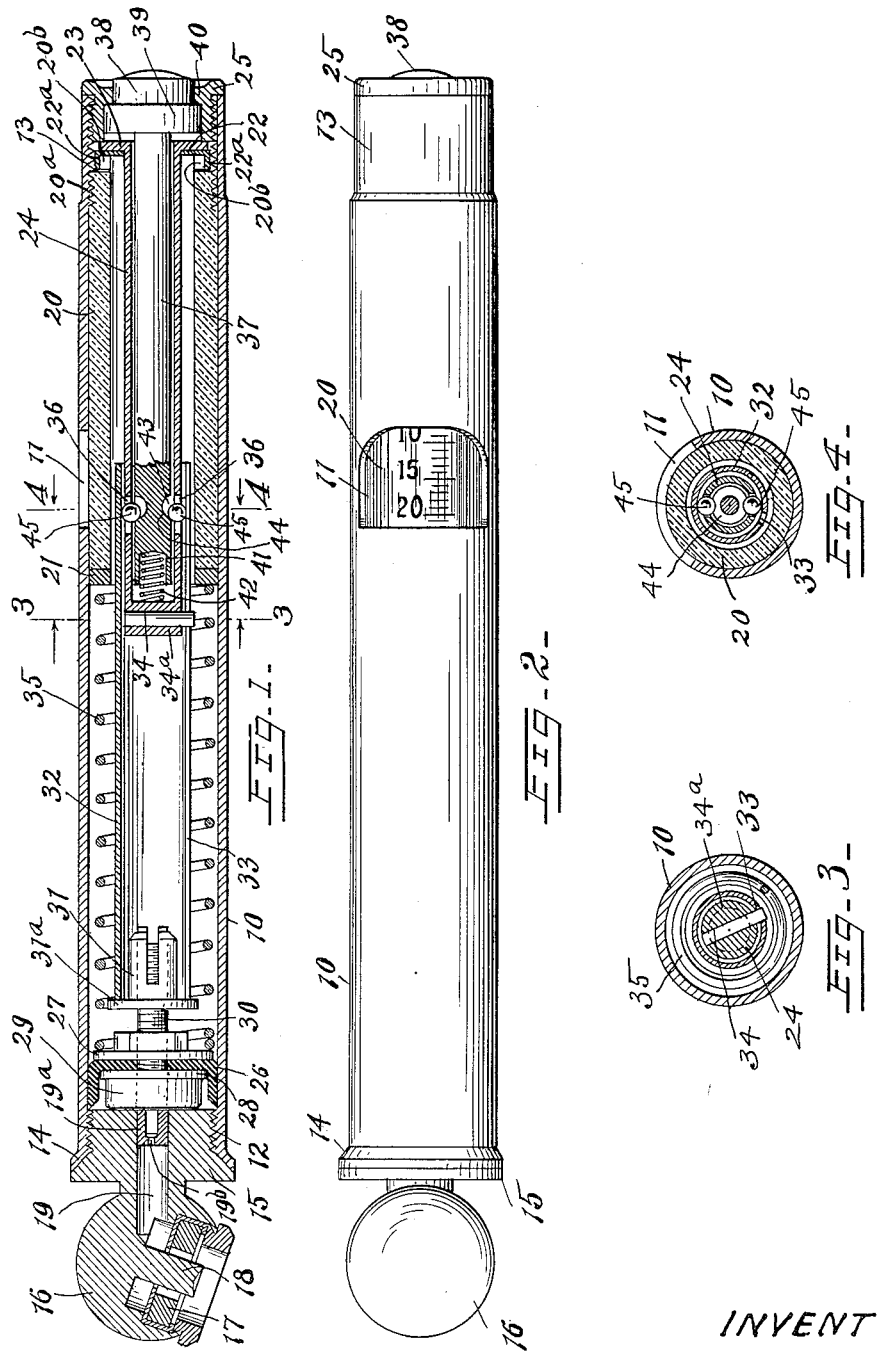
INVENTOR
JOHN C. CROWLEY
Kurs Hudson + Kent
Attys.

Patented Feb. 27, 1934

1,949,293

UNITED STATES PATENT OFFICE 1,949,293

PRESSURE GAUGE

John C. Crowley, Cleveland Heights, Ohio, assignor to The Dill Manufacturing Company, Cleveland, Ohio, a corporation of Ohio Application November 28, 1932
Serial No. 644,589

9 Claims. (Cl. 73—111)

This invention relates to a pressure gauge and particularly to a pressure gauge for testing the inflation pressure of pneumatic tires.

An object of the invention is to provide in a pressure gauge improved means for maintaining the movable plunger of the gauge in the position to which it has been moved by the fluid pressure to permit the gauge reading to be taken and for then releasing the plunger so that it can be returned to its initial or zero position.

A further and more specific object is to provide in a pressure gauge, improved means for holding the movable plunger in the position to which it has been moved and for releasing said means which is so constructed as to be positive in its operation and not subject to loss of efficiency through continued use.

A further object is to provide a pressure gauge which is simple and which is formed of relatively few parts of sturdy construction.

Additional objects and advantages will become apparent hereinafter.

An embodiment of the invention is illustrated in the accompanying drawing, wherein Figure 1 is an enlarged irregular longitudinal sectional view through the gauge;

Fig. 2 is an enlarged plan view of the gauge taken from the top of Fig. 1;

Fig. 3 is a transverse sectional view taken on line 3—3 of Fig. 1, looking in the direction of the arrows; and Fig. 4 is a transverse sectional view taken on line 4—4 of Fig. 1, looking in the direction of the arrows.

The pressure gauge illustrated herein and embodying the invention comprises a tubular casing 10 formed of metal, hard rubber, or other suitable material and provided intermediate its ends with an opening 11 constituting a window. The casing 10 is internally threaded at 12 adjacent one of its ends and is provided with a reduced internally threaded portion 13 at its opposite end.

The end of the casing having the internal threads 12 is provided with an outturned flange 14 cooperating with a complementary portion of an internally threaded extension member 15 that is screwed into the casing.

The extension member 15 is provided with a spherical head 16 forming the air-chuck portion of the gauge, such head being flattened on one side and having therein a suitable recess housing a washer and retaining ring, indicated generally at 17. A pin 18 projects outwardly of the recess and acts, when the gauge is applied to a valve stem and the end of the stem is in contact with the washer, to engage the valve pin of the valve insides to depress the same, as is well understood in the art. A passage 19 connects the recess in the head 16 with the interior of the gauge casing, such passage having located therein a plug 19a provided with a reduced opening 19b for the purpose of restricting the passage of air into the gauge and thus preventing the gauge plunger being suddenly moved toward the outer end of the gauge, rendering the same inaccurate. A transparent cylinder 20 is fitted tightly within the casing 10 so as to underlie and close the opening 11 in the casing. The cylinder 20 is externally threaded at its outer end 20a and is provided with two diametrically opposed notches 20b. The cylinder 20 is held in place by its threaded engagement with the internally threaded end 13 of the casing 10 and is prevented from rotating in the casing 10 by means of a washer 22 having two inwardly extending lugs 22a which engage in the slots 20b in the ends of the cylinder 20 and in suitable keyways formed in the reduced end 13 of the casing 10.

The cylinder 20 is further held in place by a nut 25 screwed into the end of the casing 10 and clamping the washer 22 and the head 23 of the tubular member 24 against the end of the cylinder 20. This arrangement also prevents longitudinal movement of the tubular member 24. At the opposite end of the cylinder 20 a ring member or washer 21 is placed between the end of the cylinder 20 and the end of a valve spring, later to be referred to, to provide a thrust washer for the spring and to prevent wear on the end of the cylinder.

Adjacent the extension 15 a piston is arranged in the casing and comprises a flexible cup-shaped packing 26 clamped between a washer 27 and a flange 28 of a nut 29. A threaded bolt 30 extends from the nut 29 and is provided at its outer end with a nut 31 screwed thereon and having an outstanding annular flange 31a.

A movable hollow or substantially hollow plunger 32 of the gauge fits over the nut 31 and abuts the flange 31a and such plunger is provided with suitable indicia in terms of fluid pressure which can be read through the opening 11 in the casing and the transparent cylinder 20, when the plunger has been moved from zero position. The hollow or substantially hollow member or plunger 32 is longitudinally slit for all or a part of its length, as indicated at 33, and a pin 34, fixedly mounted in the inner closed end of the tubular member 24, extends into the slit 33 in the member 32 and prevents rotative movement of said member.

A coil spring 35 is arranged in the casing and surrounds the member or plunger 32, one end of such spring bearing against the washer 27 and the other end thereof against the ring member or washer 21, it being understood that the spring 35 is properly calibrated so that the gauge will accurately indicate the fluid pressure in the tire or other article being tested. The tubular member 24 extends into the plunger 32 and, as has been previously explained, carries at its inner closed end the pin 34 which extends into the slot 33 in the plunger. Intermediate the ends of the member 24 there are provided a plurality of openings 36, it being understood that although two openings are illustrated in the drawings, there might be a greater or lesser number.

A slidable stem 37 is arranged within the tubular member 24 and is provided at its outer end with a button 38 arranged in the opening in the nut 25 and having a shoulder 39 slidably guided in said opening and limited in its inward movement by the head 23 of the member 24 and in its upward movement by an inwardly extending flange 40 formed on the nut 25. The inner end of the stem 37 is provided with a recess 41 housing a coil spring 42 which abuts the closed inner end 34a of the member 24, such spring tending to normally hold the stem 37 in its outermost position with the shoulder 39 thereof engaging the flange 40 of the nut 25. The stem 37 intermediate its ends is provided with an annular groove 43 formed with a portion of its surface inclined to provide a camming surface, as indicated at 44. Balls 45 are arranged in each of the openings 36 in the member 24 and are held in their outermost position by the camming surface 44 of the stem in which position they engage the inner surface of the plunger 32.

The strength of the coil spring 42 is such that the balls 45 will engage the plunger 32 sufficiently tight to hold the plunger in whatever position it has been moved to by the fluid pressure, but said spring is not so strong as to prevent the movement of the plunger 32 by the fluid pressure. After a reading has been taken and it is desired to allow the plunger 32 to return by gravity to its initial position, the button 38 is depressed inwardly in the casing and the balls 45 are then free to drop into the groove 43 and their restraining or holding action upon the plunger is released. It will be seen that the arrangement just described for holding the gauge plunger in the position to which it has been moved will always be efficient in action and will not deteriorate from use, as do those arrangements employing spring arms for that purpose, since the spring arms gradually lose their tension.

The gauge parts being in the position shown in Fig. 1 and the spherical head 16 of the extension 15 being applied to the valve stem of a tire or other article, the pressure fluid in said tire or article will be free to pass through the passage 19 and to exert its influence upon the piston in the gauge. The action of the pressure fluid upon the piston overcomes the action of the spring 35 and moves the piston inwardly within the casing 10. Of course, this inward movement of the piston causes the member or plunger 32 to move inwardly also, it being remembered that the frictional engagement of the balls 45 with the inner surface of the plunger is insufficient to prevent such movement. However, the engagement of the balls 45 with the plunger is sufficient to hold the plunger in the position to which it has been moved by the pressure fluid after the spring 35 returns the piston to its original position when the gauge is removed from the valve stem. Therefore, the gauge may be removed from the valve stem prior to taking the reading, if desired, and the plunger will remain in the position to which it has been moved. As soon as the reading has been taken the user of the gauge merely depresses the button 38 to cause the stem 37 to move inwardly and allow the balls 45 to fall into the groove 43 and release their frictional engagement with the plunger. The plunger will then be free to drop of its own weight or upon the shaking of the gauge back to zero position. Upon release of the button 38 the action of the spring 42 moves the plunger to its normal position with the shoulder 39 in engagement with the plunger 40 of the nut, the cam surface 44 thus being brought into contact with the balls 45 and moving the same outwardly through the openings 36 in the member 29 and into engagement with the inner surface of the plunger 32.

Although a preferred embodiment of the invention has been illustrated and described herein, it should be understood that the invention is susceptible of various modifications and adaptations within the scope of the appended claims.

Having thus described my invention, I claim:

1. A pressure gauge comprising a tubular casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, and means for holding said plunger in the position to which it has been moved by said piston and including a ball engaging said plunger, and spring tension means for holding said ball in plunger engaging position.

2. A pressure gauge comprising a tubular casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, and means for holding said plunger in the position to which it has been moved by said piston and including a plurality of balls, and means for holding said balls in frictional engagement with said plunger.

3. A pressure gauge comprising a tubular casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, and means for holding said plunger in the position to which it has been moved by said piston and including a member adapted to engage said plunger, and spring actuated cam means for moving said member linearly into engagement with said plunger and for maintaining the same in such engagement under spring tension.

4. A pressure gauge comprising a tubular casing, a piston slidable in said casing and adapted to be moved in one direction by fluid pressure, a spring engaging said piston for moving it in the opposite direction and for resisting the first named movement thereof, a substantially hollow plunger slidable in said casing and adapted to be moved in one direction by said piston, and means for holding said plunger in the position to which it has been moved by said piston and including a sleeve having an end extending into said plunger and provided with a circumferential opening, movable means arranged in said opening, and means for holding said movable means in its outermost position in said opening and in engagement with said plunger and under spring tension.

5. A pressure gauge comprising a casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, and means for holding said plunger in the position to which it has been moved by said piston and including a member adapted to engage said plunger, cam means associated with said member, a spring for moving said cam means in one direction to move said member linearly into engagement with the plunger, and means associated with said cam means and operable from exteriorly of the casing for moving said cam means against the action of said cam moving spring.

6. A pressure gauge comprising a casing, a piston slidable in said casing and adapted to be moved in one direction by fluid pressure, a spring engaging said piston for moving it in the opposite direction and for resisting the first named movement thereof, a substantially hollow plunger slidable in said casing and adapted to be moved in one direction by said piston, and means for holding the plunger in the position to which it has been moved by said piston and including a sleeve having an end extending into said plunger and provided with a circumferential opening, movable means arranged in said opening, cam means arranged in said sleeve for moving said movable means outwardly of said opening and into engagement with said plunger, and a spring acting on said cam means to maintain said movable member in its plunger engaging position.

7. A pressure gauge comprising a casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, and means for holding said plunger in the position to which it has been moved by said piston and including a movable member adapted to engage said plunger, and a movable actuating member having a cam portion cooperating with said first named movable member for moving the same into engagement with said plunger.

8. A pressure gauge comprising a casing, a piston slidable in said casing and adapted to be moved in one direction by fluid pressure, a spring for moving said piston in the opposite direction and for resisting the first named movement thereof, a plunger slidable in said casing and adapted to be moved in one direction by said piston, and means for holding said plunger in the position to which it has been moved by said piston, and including a movable member adapted to engage said plunger, and a slidable member provided with means for receiving said movable member when said slidable member is moved in one direction and with cam means for urging said movable member into plunger engaging position when said slidable member is moved in the opposite direction.

9. A pressure gauge comprising a casing, a piston slidable in said casing and adapted to be moved in one direction by fluid pressure, a spring engaging said piston for moving it in the opposite direction and for resisting the first named movement thereof, a substantially hollow plunger slidable in said casing and adapted to be moved in one direction by said piston a sleeve fixedly supported by said casing and having an end extending into said plunger and provided with a circumferential opening, movable means arranged in said opening and adapted to engage said plunger, and means for holding said movable means in its outermost position in said opening and in engagement with said plunger including a slidable stem arranged in said sleeve and having a recess formed therein to receive said movable means when said stem is moved in one direction, said recess having an inclined wall portion adapted to cam said movable means outwardly of the sleeve opening into engagement with said plunger when said stem is moved in the opposite direction, and a spring normally urging said stem in said last named direction.

JOHN C. CROWLEY.